(12) United States Patent
Ryu et al.

(10) Patent No.: US 10,985,421 B2
(45) Date of Patent: Apr. 20, 2021

(54) BATTERY MODULE WITH IMPROVED FRAME STRUCTURE AND FRAME ASSEMBLY THEREFOR

(71) Applicant: LG CHEM, LTD., Seoul (KR)

(72) Inventors: Jae-Uk Ryu, Daejeon (KR); Dal-Mo Kang, Daejeon (KR); Ji-Su Yoon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 353 days.

(21) Appl. No.: 16/064,183

(22) PCT Filed: Aug. 11, 2017

(86) PCT No.: PCT/KR2017/008759
§ 371 (c)(1),
(2) Date: Jun. 20, 2018

(87) PCT Pub. No.: WO2018/030846
PCT Pub. Date: Feb. 15, 2018

(65) Prior Publication Data
US 2019/0006647 A1  Jan. 3, 2019

(30) Foreign Application Priority Data

Aug. 12, 2016 (KR) .................. 10-2016-0103079

(51) Int. Cl.
*H01M 50/20* (2021.01)
*H01M 10/04* (2006.01)
(Continued)

(52) U.S. Cl.
CPC .......... *H01M 50/20* (2021.01); *H01M 10/04* (2013.01); *H01M 10/0486* (2013.01);
(Continued)

(58) Field of Classification Search
CPC .................................................. H01M 2/1077
See application file for complete search history.

(56) References Cited

U.S. PATENT DOCUMENTS 6,743,546 B1   6/2004  Kaneda et al.
7,887,949 B2   2/2011  Yoon
(Continued)

FOREIGN PATENT DOCUMENTS

CN      2484650 Y      4/2002
CN    101304080 A    11/2008
(Continued)

OTHER PUBLICATIONS

International Search Report for PCT/KR2017/008759 (PCT/ISA/210) dated Nov. 28, 2017.

*Primary Examiner* — Robert S Carrico
(74) *Attorney, Agent, or Firm* — Birch, Stewart, Kolasch & Birch, LLP

(57) ABSTRACT

The present disclosure provides a battery module including: at least one cell; and a frame assembly including a lower plate configured to support a lower end surface of the cell, a side plate extending perpendicularly from any opposite edge ends of the lower plate and placed adjacent to an outermost side of the cell, and an upper plate coupled to an upper end of the side plate to cover an upper portion of the cell.

10 Claims, 5 Drawing Sheets

(51) Int. Cl.
  *H01M 50/209*   (2021.01)
  *H01M 50/557*   (2021.01)
  *H01M 50/572*   (2021.01)
  *H01M 10/42*    (2006.01)
  *H01M 50/10*    (2021.01)
(52) U.S. Cl.
  CPC ..... *H01M 10/4207* (2013.01); *H01M 50/209* (2021.01); *H01M 50/557* (2021.01); *H01M 50/572* (2021.01); *H01M 50/10* (2021.01)

(56) References Cited

U.S. PATENT DOCUMENTS

| | | |
|---|---|---|
| 9,214,650 B2 | 12/2015 | Lee et al. |
| 9,252,406 B2 | 2/2016 | Kusunoki |
| 9,806,386 B2 | 10/2017 | Lim |
| 2006/0215334 A1 | 9/2006 | Hong et al. |
| 2007/0178369 A1 | 8/2007 | Conrardy et al. |
| 2011/0159336 A1 | 6/2011 | Ohkura et al. |
| 2013/0052516 A1 | 2/2013 | Kim |
| 2013/0157112 A1 | 6/2013 | Lim et al. |
| 2013/0171487 A1* | 7/2013 | Bull .................... H01M 2/1077 429/99 |
| 2013/0244066 A1 | 9/2013 | Kang et al. |
| 2014/0093765 A1* | 4/2014 | Kusunoki .............. H01G 11/06 429/120 |
| 2014/0295235 A1 | 10/2014 | Jung |
| 2015/0064521 A1 | 3/2015 | Watanabe et al. |
| 2015/0079452 A1 | 3/2015 | Park et al. |

FOREIGN PATENT DOCUMENTS

| | | |
|---|---|---|
| CN | 102315396 A | 1/2012 |
| CN | 103000835 A | 3/2013 |
| CN | 103283083 A | 9/2013 |
| CN | 203398193 U | 1/2014 |
| EP | 1 717 882 A1 | 11/2006 |
| JP | 51-41663 U | 3/1976 |
| JP | 57-197877 U | 12/1982 |
| JP | 3602797 B2 | 12/2004 |
| JP | 2011-151006 A | 8/2011 |
| JP | 2013-133044 A | 7/2013 |
| JP | 2013-536980 A | 9/2013 |
| JP | 2013-222563 A | 10/2013 |
| JP | 2016-29658 A | 3/2016 |
| JP | 2016-91871 A1 | 5/2016 |
| KR | 10-0601577 B1 | 7/2006 |
| KR | 10-2006-0113802 A | 11/2006 |
| KR | 10-2012-0051237 A | 5/2012 |
| KR | 10-2014-0089067 A | 7/2014 |
| KR | 10-2015-0031861 A | 3/2015 |
| KR | 10-2015-0064257 A | 6/2015 |

* cited by examiner

BATTERY MODULE WITH IMPROVED FRAME STRUCTURE AND FRAME ASSEMBLY THEREFOR

TECHNICAL FIELD

The present application claims priority to Korean Patent Application No. 10-2016-0103079 filed on Aug. 12, 2016 in the Republic of Korea, the disclosure of which is incorporated herein by reference.

The present disclosure relates to a battery module, and more particularly, to a battery module having a structure in which a cell is supported by an outer frame, and a frame assembly therefor.

BACKGROUND ART

In general, battery modules are formed in a structure in which a plurality of cells are assembled by series and/or parallel connection. Such a battery module includes: a cell assembly in which a plurality of cells are arranged and stacked in one direction; and a frame having a plate capable of surrounding the cell assembly.

A battery module of the related art is manufactured in a structure in which a cell assembly 20 is surrounded by a frame 10 formed in one piece by an extrusion or die casting method as shown in FIG. 1.

However, such an extrusion or die casting method is a major cause of increasing the unit price of battery modules due to high process costs, and since the expansion of battery modules is forcibly inhibited, the lifespan of cells may be negatively affected.

Alternatively, Korean Patent Application Publication No. 2015-0031861 discloses a battery module in which a side plate is placed adjacent to a side of a cell assembly. The battery module disclosed in Korean Patent Application Publication No. 2015-0031861 includes: a plurality of battery cells aligned in one direction; and a side plate placed adjacent to sides of the battery cells, wherein the side plate includes a pressing region protruding toward the battery cells to press the battery cells, and since the pressing region applies tension to the battery cells and prevents movement of the battery cells, the battery module is improved in safety.

Korean Patent Application Publication No. 2012-0051237 discloses a battery module case in which at least two pouch-type secondary batteries are stacked and arranged side by side with electrode tap sides of the pouch-type secondary batteries being arranged in the same manner, wherein each of the pouch-type secondary batteries is mounted in a vertically or horizontally sliding manner, the battery module case is coupled to outer surfaces of the pouch-type secondary batteries including the electrode tap sides, and the battery module case has an upper, lower, and side separable assembly structure.

Although techniques as described above have been proposed, technical means for stably supporting battery modules and reducing material or process costs while somewhat allowing the expansion of an end plate caused by swelling has not yet been proposed, and thus measures are needed.

DISCLOSURE

Technical Problem

The present disclosure is designed by taking problems as described above into consideration, and therefore the present disclosure is directed to providing a battery module having a structure in which a frame is formed by assembling plates made of a material such as a metal sheet, and to providing a frame assembly therefor.

Another object of the present disclosure is to provide a battery module having a structure in which a frame is formed through a welding process, and to provide a frame assembly therefor.

Technical Solution

To achieve the above-described objects, the present disclosure provides a battery module including: at least one cell; and a frame assembly including a lower plate configured to support a lower end surface of the cell, a side plate extending perpendicularly from any opposite edge ends of the lower plate and placed adjacent to an outermost side of the cell, and an upper plate coupled to an upper end of the side plate to cover an upper portion of the cell.

Preferably, an edge portion of the upper plate is coupled to the upper end of the side plate by welding.

The battery module of the present disclosure may further include a first guide plate extending perpendicularly from other opposite edge ends of the lower plate to prevent separation of the cell.

The first guide plate may be bent from the lower plate in one piece with the lower plate.

The battery module of the present disclosure may further include a second guide plate extending perpendicularly from an edge end of the upper plate to prevent separation of the cell.

The second guide plate may be bent from the upper plate in one piece with the upper plate.

The side plate may be bent from the lower plate in one piece with the lower plate.

In another aspect of the present disclosure, there is provided a frame assembly of a battery module for supporting at least one cell from an outside of the battery module, the frame assembly including: a lower plate configured to support a lower end surface of the cell; a side plate perpendicularly extending from any opposite edge ends of the lower plate and placed adjacent to an outermost side of the cell; and an upper plate placed to cover an upper portion of the cell, opposite edge ends of the upper plate being coupled to an upper end of the side plate.

Advantageous Effects

According to the present disclosure, the frame assembly of the battery module is made of a plate material such as a metal sheet for weight reduction and is assembled through a welding process for reducing process costs.

In addition, even when the battery module swells due to an overcharged cell, the expansion of the side plate may be properly allowed, and thus the lifespan of the cell may not be negatively affected.

DESCRIPTION OF DRAWINGS

The accompanying drawings illustrate preferred embodiments of the present disclosure and together with the foregoing disclosure, serve to provide further understanding of the technical features of the present disclosure, and thus, the present disclosure is not construed as being limited to the drawings.

BEST MODE

Figure 1:
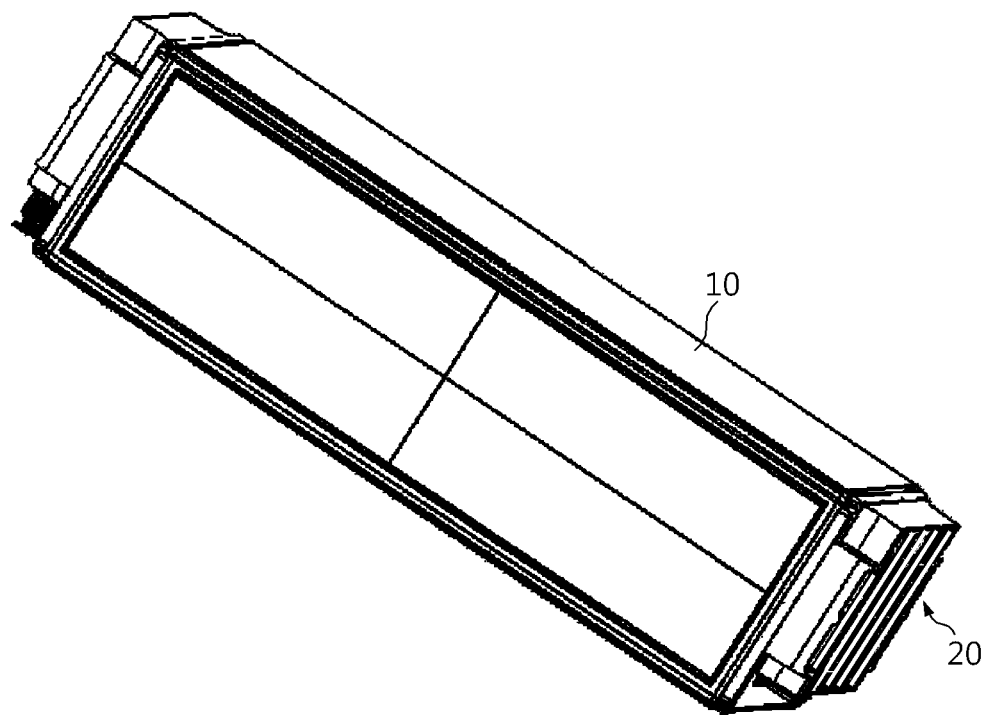
FIG. 1 is a perspective view illustrating an appearance of a battery module of the related art.
Figure 2:
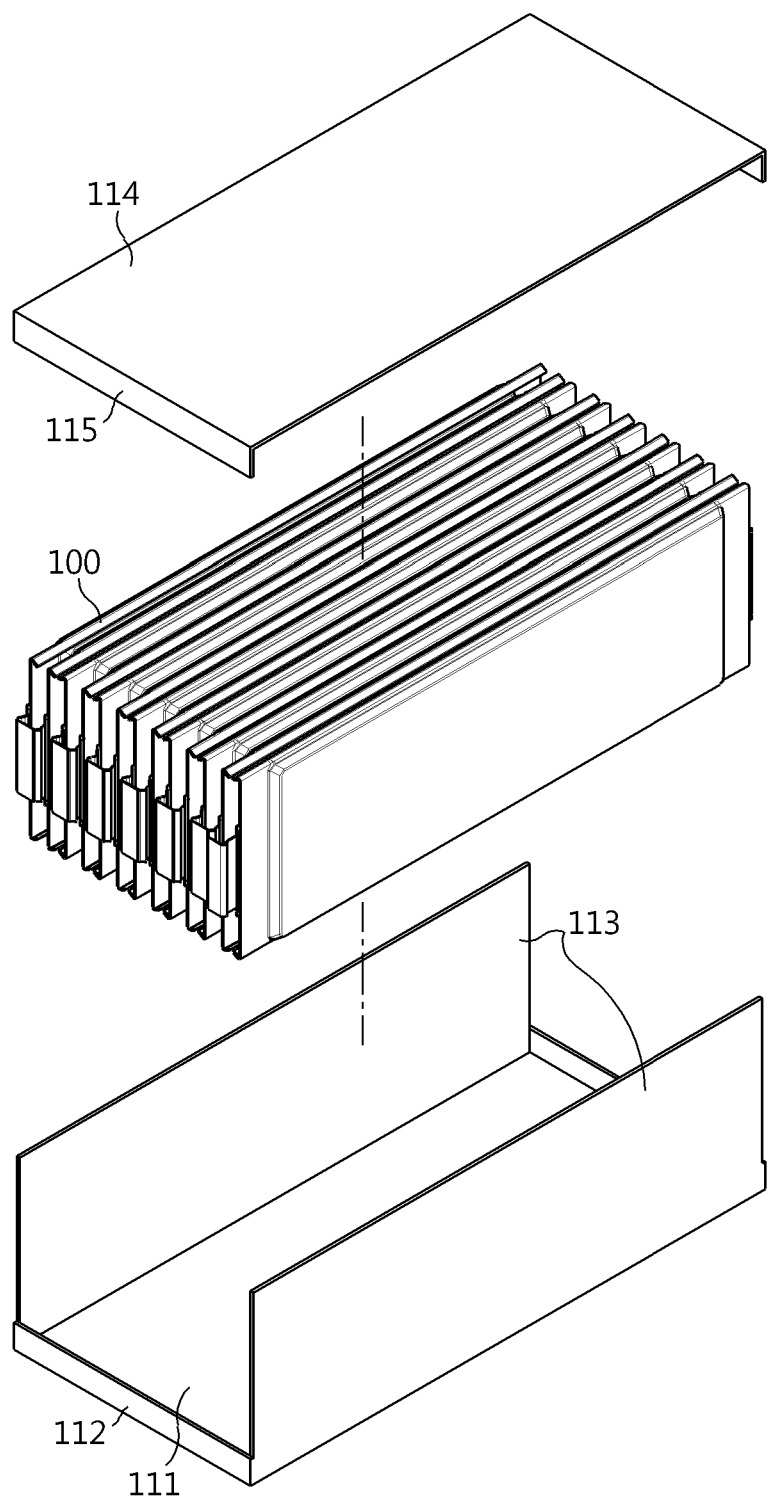
FIG. 2 is an exploded perspective view illustrating a configuration of a battery module according to a preferred embodiment of the present disclosure.

FIG. 2 is an exploded perspective view illustrating a configuration of a battery module according to a preferred embodiment of the present disclosure.

Referring to FIG. 2, according to the preferred embodiment of the present disclosure, the battery module includes: a plurality of cells 100; and a frame assembly 110 arranged to surround the plurality of cells 100 and including a lower plate 111, a side plate 113, and an upper plate 114.

Each of the cells 100 has a thin plate-like body, and is preferably a pouch-type secondary cell. The plurality of cells 100 are arranged in one direction to substantially form a stacked structure.

The frame assembly 110 is a structure for accommodating, supporting, and protecting the cells 100 in units of a plurality of cells, and the frame assembly 110 includes the lower plate 111 placed below the cells 100, the side plate 113 placed adjacent to outermost sides of the cells 100, and the upper plate 114 placed above the cells 100. Each of the plates 111, 113, and 114 of the frame assembly 110 is formed of a metal sheet (or a metal plate) such as an aluminum plate having a thin thickness of about several millimeters.

The lower plate 111 has a base surface capable of collectively supporting lower end surfaces of the plurality of cells 100.

The side plate 113 extends perpendicularly upwards from any opposite edge ends of the lower plate 111 and are placed adjacent to the outermost sides of the cells 100. That is, a pair of side plates 113 are provided, and the interval between the side plates 113 is set to such an extent as to accommodate the plurality of cells 100. Preferably, the side plates 113 are bent from the lower plate 111 in one piece with the lower plate 111 to form a ⊏-shaped section.

A first guide plate 112 extends perpendicularly upwards from other opposite edge ends of the lower plate 111 to a height of several centimeters so as to prevent separation of the cells 100 from the frame assembly 110 in forward and backward directions, that is, in directions perpendicular to the direction in which the cells 100 are arranged. Preferably, the first guide plate 112 is bent from the lower plate 111 in one piece with the lower plate 111.

The upper plate 114 is coupled to upper ends of the side plates 113 to collectively cover upper portions of the plurality of cells 100. Preferably, opposite edge portions of the upper plate 114 are respectively welded to the upper ends of the side plates 113. Thus, weld zones (refer to W in FIG. 3) are formed on edge portions at which the side plates 113 meet the upper plate 114. Here, a welding method such as a laser welding method, an ultrasonic welding method, or a spot welding method may be used.

Figure 3:
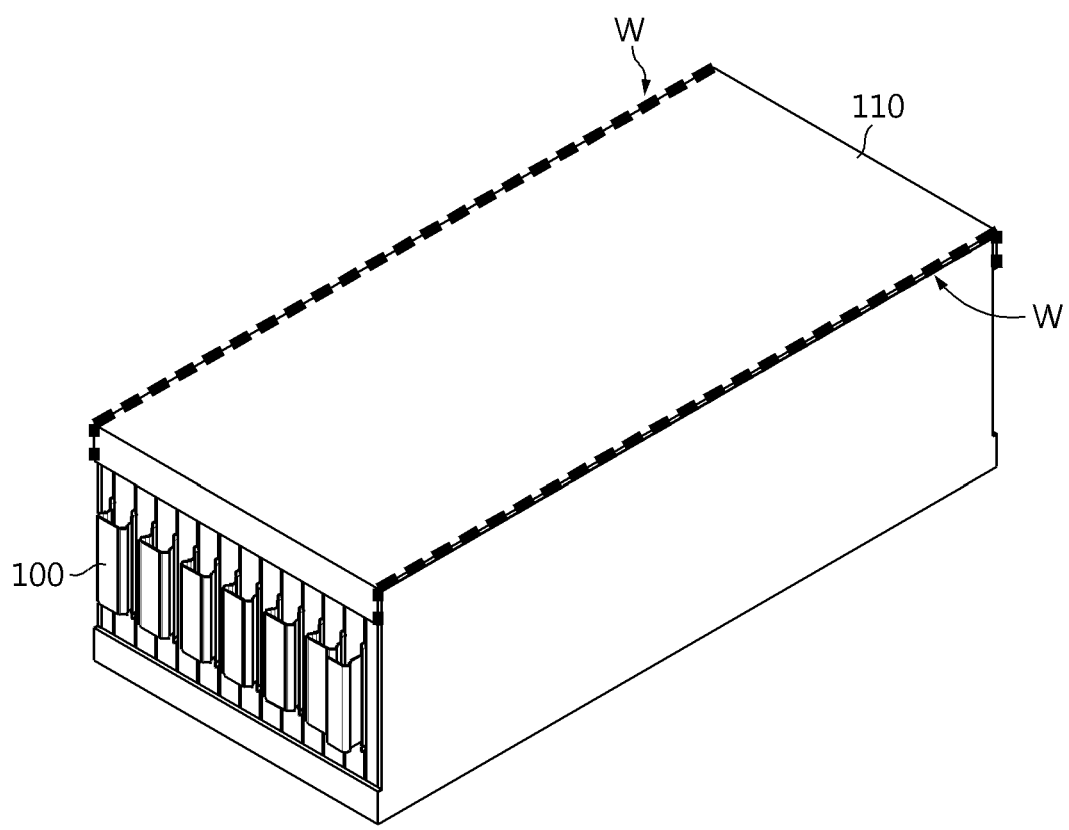
FIG. 3 is an assembled perspective view illustrating the battery module of FIG. 2.

FIG. 3 illustrates a state in which the upper plate 114 is assembled to the upper ends of the side plates 113 by welding. As illustrated in FIG. 3, the battery module including the frame assembly 110 provided in units of a plurality of cells 100 is manufactured by welding edge portions of the upper plate 114 to the upper ends of the side plates 113 in a state in which the plurality of cells 100 are arranged in the frame assembly 110.

Preferably, the width of the upper plate 114 is substantially the same as the interval between inner surfaces of the pair of side plates 113 or the interval between outer surfaces of the pair of side plates 113.

A second guide plate 115 extends to a height of several centimeters, perpendicularly downwards from opposite edge ends of the upper plate 114 which are not in contact with the side plates 113, so as to prevent separation of the cells 100 from the frame assembly 110 in forward and backward directions, that is, in directions perpendicular to the direction in which the cells 100 are arranged. Preferably, the second guide plate 115 is bent from the upper plate 114 in one piece with the upper plate 114.

Figure 4:
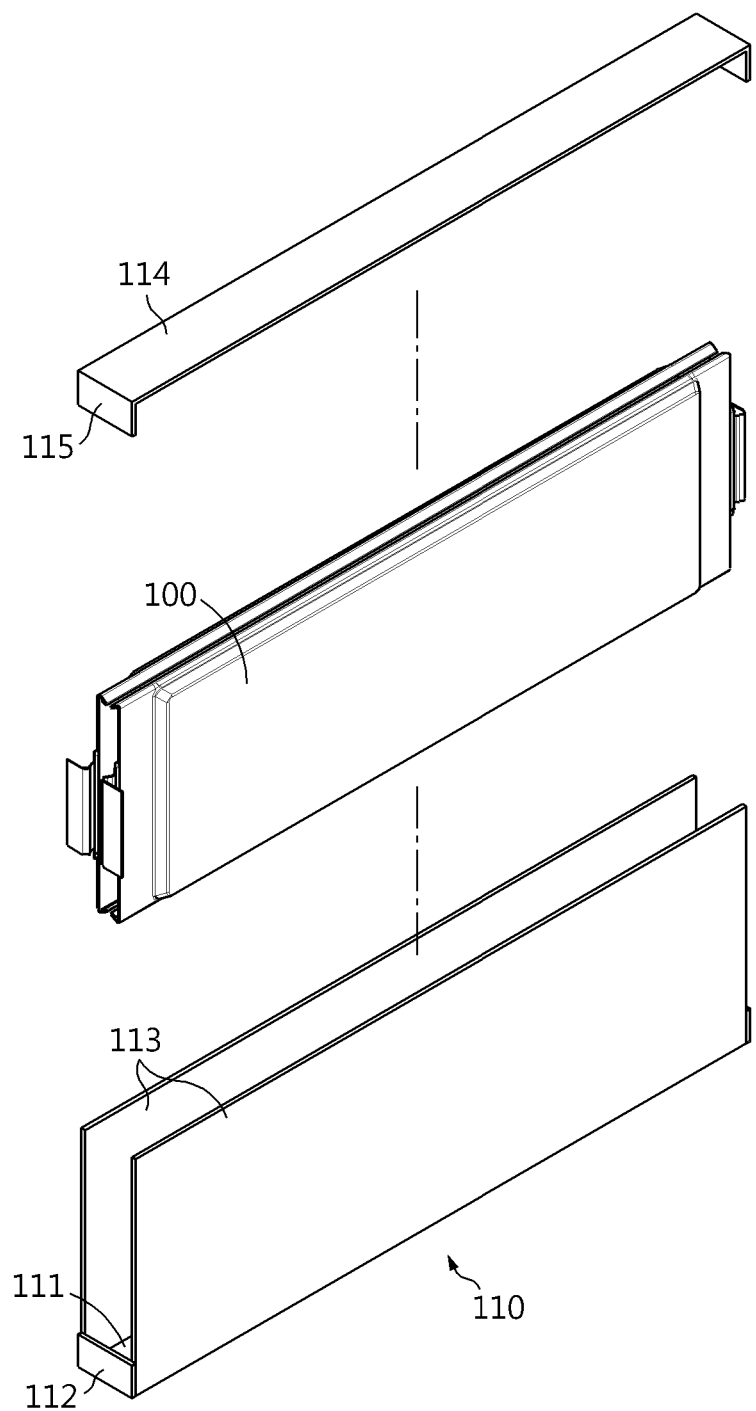
FIG. 4 is a perspective view illustrating a configuration of a battery module according to another embodiment of the present disclosure.

Another embodiment of the present disclosure provides a battery module having a structure in which a frame assembly 110 is coupled on a single cell basis as shown in FIG. 4. In this case, the battery module includes: a cell 100 disposed alone; and the frame assembly 110 provided to correspond to the single cell 100 and disposed to surround the cell 100, the frame assembly 110 including a lower plate 111, a side plate 113, and an upper plate 114.

Since the frame assembly 110 is provided to correspond to each single cell 100, only one cell 100 is accommodated in the frame assembly 110, and thus the frame assembly 110 may have a slim shape. The lower plate 111, the side plate 113, and the upper plate 114 of the frame assembly 110 have the same specific configuration and coupling relationship as those described in the above embodiment, and thus detailed descriptions thereof will be omitted.

Figure 5:
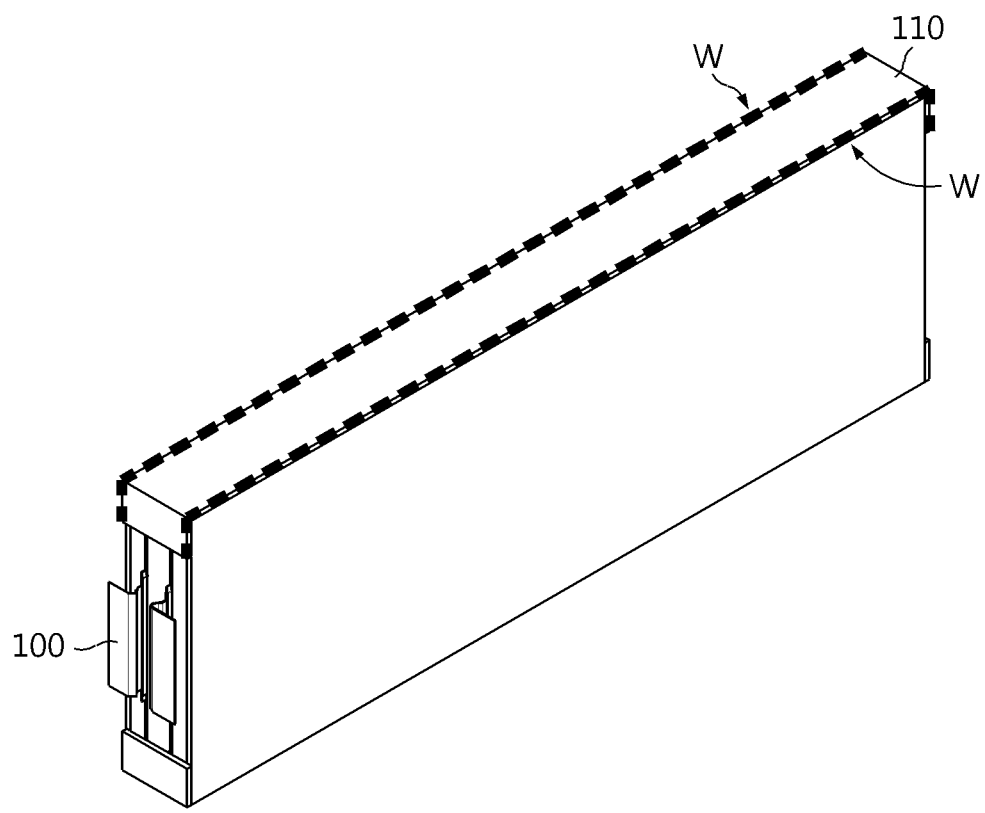
FIG. 5 is an assembled perspective view illustrating the battery pack of FIG. 4.

As illustrated in FIG. 5, the battery module including the frame assembly 110 provided on a cell basis is manufactured by welding an edge portion of the upper plate 114 to an upper end of the side plate 113 in a state in which the single cell 100 is placed in the frame assembly 110. Thus, weld zones W are formed on edge portions at which the side plate 113 meets the upper plate 114.

In the battery module having the above-described configuration according to the preferred embodiment of the present disclosure, the frame assembly 110 is assembled in units of a single cell 100 or a plurality of cells 100.

The frame assembly 110 may be light because the lower plate 111, the side plate 113, and the upper plate 114 formed of a metal sheet (or a metal plate) such as an aluminum plate are organically coupled to each other.

When the frame assembly 110 is manufactured, the lower plate 111 and the side plate 113 are formed in one piece through a bending process, and the upper plate 114 is coupled to the upper end of the side plate 113 by a welding process such as a laser welding process or an ultrasonic welding process.

INDUSTRIAL APPLICABILITY

According to the present disclosure, a battery module having a lower weight and incurring lower assembly costs compared to the case of using a frame manufactured by a convention extrusion or die casting method may be provided.

What is claimed is:

1. A battery module comprising:
   at least one cell; and
   a frame assembly comprising a lower plate configured to support a lower end surface of the cell, a side plate extending perpendicularly from any opposite edge ends of the lower plate and placed adjacent to an outermost side of the cell, an upper plate coupled to an upper end of the side plate to cover an upper portion of the cell, a first guide plate extending perpendicularly from other opposite edge ends of the lower plate to prevent separation of the cell, and a second guide plate extending perpendicularly from an edge end of the upper plate to prevent separation of the cell, wherein the first guide plate and the second guide plate are arranged opposite each other and are spaced from each other, and wherein an edge of the upper plate is welded to the upper end of the side plate.

2. The battery module of claim 1, wherein the first guide plate is bent from the lower plate in one piece with the lower plate.

3. The battery module of claim 1, wherein the second guide plate is bent from the upper plate in one piece with the upper plate.

4. The battery module of claim 1, wherein the side plate is bent from the lower plate in one piece with the lower plate.

5. The frame assembly of claim 1, wherein an overall height of the first guide plate is less than an overall height of the side plates.

6. A frame assembly of a battery module for supporting at least one cell from an outside of the cell, the frame assembly comprising:

a lower plate configured to support a lower end surface of the cell;

a side plate perpendicularly extending from any opposite edge ends of the lower plate and placed adjacent to an outermost side of the cell;

an upper plate placed to cover an upper portion of the cell, opposite edge ends of the upper plate being coupled to an upper end of the side plate;

a first guide plate extending perpendicularly from other opposite edge ends of the lower plate to prevent separation of the cell; and a second guide plate extending perpendicularly from an edge end of the upper plate to prevent separation of the cell, wherein the first guide plate and the second guide plate are arranged opposite each other and are spaced from each other.

7. The frame assembly of claim 6, wherein the edge ends of the upper plate are welded to the upper end of the side plate.

8. The frame assembly of claim 6, wherein the first guide plate is bent from the lower plate in one piece with the lower plate.

9. The frame assembly of claim 6, wherein the second guide plate is bent from the upper plate in one piece with the upper plate.

10. The frame assembly of claim 6, wherein the side plate is bent from the lower plate in one piece with the lower plate.

* * * * *